United States Patent
Jang et al.

(10) Patent No.: US 10,732,458 B2
(45) Date of Patent: *Aug. 4, 2020

(54) BACKLIGHT UNIT AND LIQUID CRYSTAL DISPLAY DEVICE INCLUDING THE SAME

(71) Applicant: Samsung Electronics Co., Ltd., Suwon-si, Gyeonggi-do (KR)

(72) Inventors: Eun-joo Jang, Suwon-si (KR); Hyun-a Kang, Suwon-si (KR); Oul Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 190 days.

This patent is subject to a terminal disclaimer.

(21) Appl. No.: 15/887,015

(22) Filed: Feb. 2, 2018

(65) Prior Publication Data
US 2018/0180944 A1   Jun. 28, 2018

Related U.S. Application Data

(63) Continuation of application No. 15/453,948, filed on Mar. 9, 2017, now Pat. No. 9,933,658, which is a (Continued)

(30) Foreign Application Priority Data

Sep. 7, 2012   (KR) .......................... 10-2012-0099549

(51) Int. Cl.
  *G02F 1/13357* (2006.01)
  *F21V 8/00* (2006.01)
  (Continued)

(52) U.S. Cl.
  CPC .......... *G02F 1/133606* (2013.01); *F21V 9/30* (2018.02); *G02B 6/0003* (2013.01);
  (Continued)

(58) Field of Classification Search
  None
  See application file for complete search history.

(56) References Cited

U.S. PATENT DOCUMENTS

6,649,138 B2   11/2003 Adams et al.
7,018,713 B2 *   3/2006 Padiyath ................. B32B 27/08
                                              428/411.1
(Continued)

FOREIGN PATENT DOCUMENTS

JP   2006096108 A   4/2005
KR   100535340 A   11/2005
(Continued)

*Primary Examiner* — Ryan Crockett
(74) *Attorney, Agent, or Firm* — Cantor Colburn LLP

(57) ABSTRACT

A backlight unit for a liquid crystal display device including a liquid crystal panel, includes: a light source including a light-emitting diode ("ED") which generates and emits light; and a light converting layer between the light source and the liquid crystal panel, spaced apart from the light source, and converting the light from the light source into white light and emitting the white light toward the liquid crystal panel. The light converting layer includes: semiconductor nanocrystals, and a barrier material which restricts penetration of moisture or oxygen.

26 Claims, 13 Drawing Sheets

Related U.S. Application Data continuation of application No. 14/010,718, filed on Aug. 27, 2013, now Pat. No. 9,606,281.

(51) Int. Cl.
*F21V 9/30* (2018.01)
*B82Y 20/00* (2011.01)

(52) U.S. Cl.
CPC ........... *G02B 6/005* (2013.01); *G02B 6/0051* (2013.01); *G02F 1/133603* (2013.01); *G02F 1/133617* (2013.01); *B82Y 20/00* (2013.01); *G02B 6/0068* (2013.01); *G02B 6/0073* (2013.01); *G02F 2001/133614* (2013.01); *G02F 2202/36* (2013.01); *Y10S 977/834* (2013.01)

(56) References Cited

U.S. PATENT DOCUMENTS

| | | | | |
|---|---|---|---|---|
| 8,035,772 B2* | 10/2011 | Kim | ........... | G02F 1/133603 349/69 |
| 8,440,736 B2 | 5/2013 | Hoyle et al. | | |
| 9,470,399 B1* | 10/2016 | Skipor | ........... | G02F 1/1336 |
| 2004/0164669 A1* | 8/2004 | Kawaguchi | ........... | H01L 27/322 313/501 |
| 2006/0221672 A1* | 10/2006 | Drndic | ........... | B82Y 30/00 365/151 |
| 2006/0244358 A1* | 11/2006 | Kim | ........... | C09K 11/025 313/486 |
| 2007/0103068 A1* | 5/2007 | Bawendi | ........... | B82Y 20/00 313/506 |
| 2008/0191604 A1* | 8/2008 | Morris | ........... | B82Y 20/00 313/499 |
| 2008/0237540 A1* | 10/2008 | Dubrow | ........... | C09K 11/025 252/301.65 |
| 2009/0242871 A1* | 10/2009 | Kobayashi | ........... | C09K 11/025 257/13 |
| 2009/0253805 A1 | 10/2009 | Hoyle et al. | | |
| 2009/0317044 A1 | 12/2009 | Buretea et al. | | |
| 2010/0110728 A1* | 5/2010 | Dubrow | ........... | C09K 11/025 362/615 |
| 2010/0134520 A1* | 6/2010 | Coe-Sullivan | ........... | B82Y 20/00 345/690 |
| 2010/0155676 A1* | 6/2010 | Jang | ........... | B82Y 30/00 252/521.3 |
| 2010/0155744 A1* | 6/2010 | Jang | ........... | B32B 27/08 257/79 |
| 2010/0155749 A1* | 6/2010 | Chen | ........... | C09K 11/025 257/89 |
| 2011/0279402 A1* | 11/2011 | Yoo | ........... | G06F 3/044 345/174 |
| 2012/0025252 A1* | 2/2012 | Ichizono | ........... | C04B 35/117 257/98 |
| 2012/0293063 A1* | 11/2012 | Kang | ........... | C09K 11/02 313/502 |
| 2013/0265522 A1* | 10/2013 | Jung | ........... | G02F 1/1336 349/61 |
| 2015/0378217 A1* | 12/2015 | Kim | ........... | G02F 1/133617 349/71 |
| 2017/0082896 A1* | 3/2017 | Jang | ........... | H01L 33/507 |

FOREIGN PATENT DOCUMENTS

| | | |
|---|---|---|
| KR | 1020050110882 A | 11/2005 |
| KR | 1020060108244 A | 10/2006 |
| KR | 1020070059066 A | 6/2007 |
| KR | 1020070110584 A | 11/2007 |
| KR | 1020080003789 A | 1/2008 |
| KR | 1020080040632 A | 5/2008 |
| KR | 1020080070865 A | 7/2008 |
| KR | 1020090078547 A | 7/2009 |
| KR | 1020110111391 A | 10/2011 |
| KR | 1020120056001 A | 6/2012 |
| WO | 2010077226 A1 | 7/2010 |

* cited by examiner

BACKLIGHT UNIT AND LIQUID CRYSTAL DISPLAY DEVICE INCLUDING THE SAME

CROSS-REFERENCE TO RELATED APPLICATION

This application is a continuation application of U.S. application Ser. No. 15/453,948 filed Mar. 9, 2017, which is a continuation application of U.S. application Ser. No. 14/010,718 filed Aug. 27, 2013 and issued as U.S. Pat. No. 9,606,281 on Mar. 28, 2017, which claims priority to and the benefit of Korean Patent Application No. 10-2012-0099549, filed on Sep. 7, 2012, in the Korean Intellectual Property Office, the disclosure of which is incorporated herein in its entirety by reference.

BACKGROUND

1. Field

Provided is a backlight unit using light-emitting diodes ("LEDs") as a light source and liquid crystal display ("LCD") devices including the backlight unit.

2. Description of the Related Art

Unlike plasma display panels ("PDPs") and field emission display ("FED") devices, liquid crystal display ("LCD") devices are light-receiving display devices that may form an image by receiving external light instead of using light generated and emitted therein. Accordingly, LCD devices include backlight units that are disposed on rear surfaces of the LCD devices and emit light.

Backlight units for conventional LCD devices use cold cathode fluorescent lamps ("CCFLs") as light sources. However, in this case, color purity may decrease and it is more difficult to achieve uniformity in brightness as sizes of the conventional LCD devices increase.

SUMMARY

Provided is a backlight unit using light-emitting diodes ("LEDs") as a light source and a liquid crystal display ("LCD") device including the backlight unit.

Additional aspects will be set forth in part in the description which follows and, in part, will be apparent from the description, or may be learned by practice of the presented embodiments.

Provided is a backlight unit for a LCD device including a liquid crystal panel, including: a light source including a LED which generates and emits light; and a light converting layer between the light source and the liquid crystal panel, and spaced apart from the light source. The light converting layer converts the light from the light source into white light and emits the white light toward the liquid crystal panel. The light converting layer includes semiconductor nanocrystals, and a barrier material which restricts penetration of moisture or oxygen.

The light converting layer may further include a transparent substrate, a light converting film on a surface of the transparent substrate and including the semiconductor nanocrystals, and a barrier layer on a surface of the light converting film and including the barrier material. The barrier layer may also be on a surface of the transparent substrate, opposite to the surface of the light converting film.

The light converting layer may further include a light converting film including the semiconductor nanocrystals, and a barrier layer on a surface of the light converting film and including the barrier material.

The light converting layer may further include a light converting film including the semiconductor nanocrystals and the barrier material.

The light converting layer may further include a barrier layer on a surface of the light converting film and including the barrier material.

The barrier material in the light converting film may restrict penetration of one of the moisture or the oxygen, and the barrier material in the barrier layer may restrict the other of the moisture and the oxygen.

A moisture transmission rate or an oxygen transmission rate of the barrier material may be equal to or less than about 0.1 cubic centimeter per square meter per day ($cc/m^2/day$).

The backlight unit may further include a plurality of light converting layers which converts the light into light of different colors. The plurality of light converting layers may be arranged to have an emission wavelength with lower energy as a distance from the light source decreases. The plurality of light converting layers may be spaced apart from one another, and a blank layer may be defined between adjacent light converting layers of the plurality of light converting layers.

The barrier material may include at least one selected from an organic material and an inorganic material. The barrier material may include the organic material and the inorganic material repeatedly alternated in a stack. The organic material may include at least one selected from thiolene, hybrid epoxy, polyurea, polytetrafluoroethylene ("PTFE"), polydimethylsiloxane ("PDMS"), polyvinylchloride, polycarbonate, polystyrene, polyimide, parylene, polyethylacrylate and polymethylmethacrylate, and the inorganic material may include at least one selected from silicon oxide, aluminum oxide, titanium oxide, indium oxide, tin oxide, indium oxide, tantalum oxide, zirconium oxide and niobium oxide.

The backlight unit may further include a diffusive plate between the light source and the light converting layer, or between the light converting layer and the liquid crystal panel. The light converting layer may contact a surface of the diffusive plate.

The light converting layer may further include light diffusing particles which diffuse the light.

The light converting layer may further include a light-converting diffusive film including the semiconductor nanocrystals and the light diffusing particles, and a barrier layer on a surface of the light-converting diffusive film and including the barrier material.

The light converting layer may further include a light-converting diffusive film including the semiconductor nanocrystals, the barrier material and the light diffusing particles.

The light converting layer may further include a barrier layer on a surface of the light-converting diffusive film and including the barrier material.

An adhesive layer including the barrier material may be on a side surface of the light converting layer.

The backlight unit may further include a light guide plate between the light source and the light converting layer. The light guide plate guides the light toward the light converting layer.

The light guide plate may include a light emitting first surface, a second surface opposite to the light emitting first surface, and a side surface connecting the first and second surfaces to each other. The light source may face the side surface of the light guide plate.

The backlight unit may further include an optical sheet between the light source and the liquid crystal panel. The optical sheet may include at least one selected from a prism sheet, a brightness enhancement sheet and a micro-lens sheet.

The light source may emit blue light or ultraviolet light. The light source may include a substrate, and a plurality of LEDs on the substrate.

Provided is a backlight unit for a LCD device including a liquid crystal panel, including: a light source including a LED which generates and emits light; a light guide plate between the light source and the liquid crystal panel, and including semiconductor nanoparticles which convert the light into white light, the light guide plate guiding the light from the light source toward the liquid crystal panel; and a barrier layer on a surface of the light guide plate, and including a barrier material which restricts penetration of moisture or oxygen.

The light guide plate may include a light emitting first surface, a second surface opposite to the light emitting first surface, and a side surface connecting the first and second surfaces to each other, and the light source may face the side surface of the light guide plate.

The backlight unit may further include a diffusive plate between the light guide plate and the liquid crystal panel. The light guide plate may further include light diffusing particles which diffuse the light.

The backlight unit may further include an adhesive layer on a side surface of the light guide plate, and including the barrier material.

Provided is a LCD device including: a light source including a LED which generates and emits light; a light converting layer spaced apart from the light source, the light converting layer converting the light from the light source into white light and outputting the white light toward a liquid crystal panel, the light converting layer including: semiconductor nanoparticles, and a barrier material which restricts penetration of moisture or oxygen; and the liquid crystal panel which forms an image using the white light from the light converting layer.

Provided is a LCD device including: a light source comprising a LED which generates and emits light; a light guide plate including semiconductor nanocrystals which convert the light into white light, the light guide plate guiding the light from the light source toward a liquid crystal display panel; a barrier layer on a surface of the light guide plate, and including a barrier material which restricts penetration of moisture or oxygen; and the liquid crystal panel which forms an image using the white light from the light guide plate.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
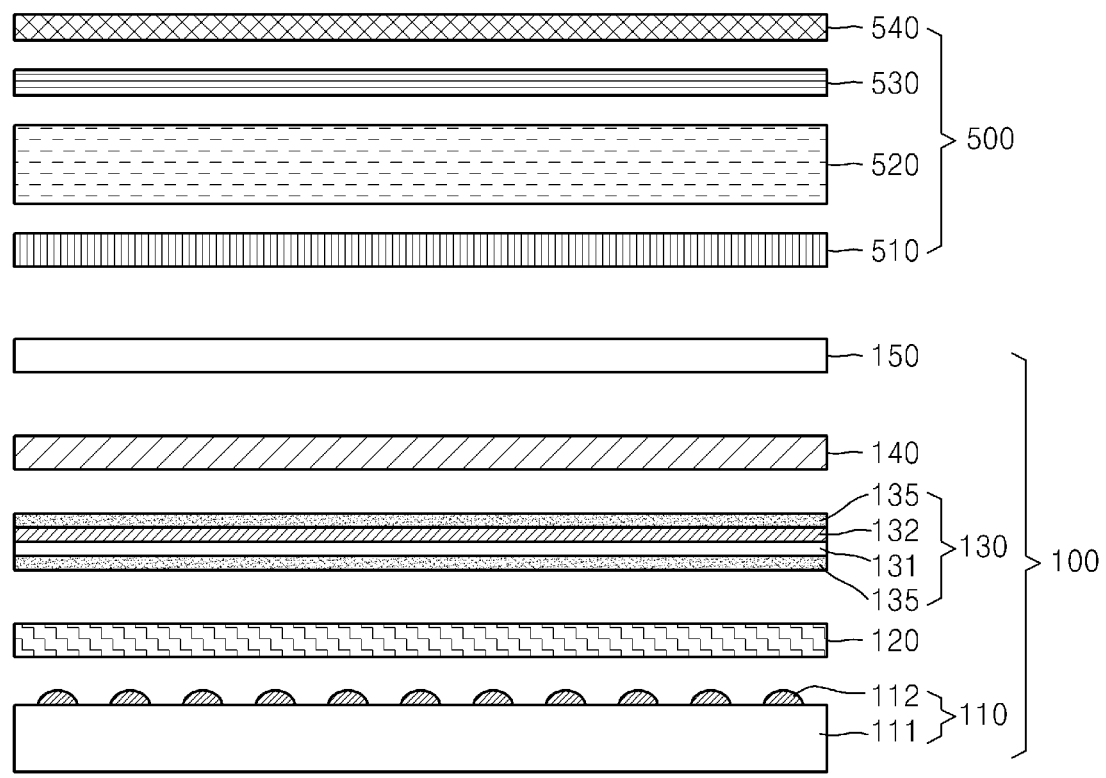
FIG. 1 is a cross-sectional view illustrating an embodiment of a liquid crystal display ("LCD") device.

It will be understood that when an element or layer is referred to as being "on" or "coupled to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items. Expressions such as "at least one" and "at least one selected from," when preceding a list of elements, modify the entire list of elements and do not modify the individual elements of the list.

The invention will now be described more fully with reference to the accompanying drawings, in which embodiments of the invention are shown. In the drawings, the same reference numerals denote the same elements, and sizes of thicknesses of elements may be exaggerated for clarity.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

Backlight units may include three color light emitting diodes ("LEDs") as light sources. Backlight units using three color LEDs as light sources may be applied to high quality display devices because the backlight units using three color LEDs may obtain high color purity. However, backlight units using three color LEDs as light sources are undesirably more expensive than backlight units using cold cathode fluorescent lamps ("CCFLs") as light sources.

In order to reduce costs, white LEDs that convert light output from an LED chip of one color into white light and output the white light have been developed. However, although such white LEDs may reduce costs, the white LEDs have lower color purity and lower color reproducibility than three color LEDs. Accordingly, there remains a need for a backlight unit with improved color reproducibility and color purity, and cost competitiveness.

FIG. 1 is a cross-sectional view illustrating an embodiment of a liquid crystal display ("LCD") device.

Referring to FIG. 1, the LCD device includes a backlight unit 100, and a liquid crystal panel 500 that forms an image of a specific color by using white light emitted from the backlight unit 100. The backlight unit 100 includes a LED light source 110, and a light converting layer 130. The light converting layer 130 converts light emitted from the LED light source 110 into white light and outputs the white light to the liquid crystal panel 500. The LED light source 110 may include a substrate 111, and a plurality of LEDs 112 that is disposed at predetermined intervals on the substrate 111. The LED light source 110 may be a light source that emits blue light. However, the present embodiment is not limited thereto, and the LED light source 110 may be a light source that emits ultraviolet light.

The light converting layer 130 is disposed between the LED light source 110 and the liquid crystal panel 500, and is spaced apart from the LED light source 110 by a predetermined distance. Each of the LED light source 110 and the light converting layer 130 may have a planar size corresponding to the liquid crystal panel 500, such as in a plane view of the LCD device from a viewing side and/or a rear side thereof.

The light converting layer 130 may include a transparent substrate 131, a light converting film 132 that is disposed such as by coating on the transparent substrate 131 and includes semiconductor nanocrystals, and a barrier layer 135 that is disposed on a top surface of the light converting film 132 and includes a barrier material. The transparent substrate 131 may include, but is not limited to, a resin such as polyethylene terephthalate ("PET").

The light converting film 132 converts light emitted from the LED light source 110 into white light. The light converting film 132 may include semiconductor nanocrystals that may obtain high color reproducibility and high color purity. For example, the semiconductor nanocrystals may include at least one selected from a Group II-VI material, a Group III-V material, and a Group IV element. The term "Group" refers to a group of the Periodic Table of the Elements. The Group II-VI material, and Group III-V material may each independently include at least one selected from a binary compound, a ternary compound, and a quaternary compound. The Group II-VI material may include at least one selected from HgTe, HgSe, HgS, CdTe, CdSe, CdS, ZnTe, ZnSe, ZnS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, HgZnTeS, CdZnSeS, CdZnSeTe, CdZnSTe, CdHgSeS, CdHgSeTe, CdHgSTe, HgZnSeS, HgZnSeTe, and HgZnSTe; the Group III-V material may include at least one selected from GaN, GaP, InN, InP, InAs, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, and InAlPSb; and the Group IV element may include at least one selected from Si and Ge. The materials are exemplarily described as materials of the semiconductor nanocrystals, and other various semiconductor materials may be used as materials for the semiconductor nanocrystals. The light converting film 132 may be, for example, a polymer film in which the semiconductor nanocrystals are dispersed.

The barrier layer 135 may be disposed on a top surface of the light converting film 132, toward the viewing side of the LCD. The barrier layer 135 restricts penetration of moisture and/or oxygen thereto, such that the barrier layer 135 reduces or effectively prevents external moisture and/or oxygen from penetrating into the light converting film 132. In detail, the light converting film 132 including the semiconductor nanocrystals reacts with ambient oxygen or moisture when receiving light from the LED light source 110 and converting the light, to thereby cause a physicochemical change. Accordingly, as time passes, optical properties of the light converting film 132, for example, a wavelength, a full width at half maximum, or quantum efficiency, may be undesirably changed. In order to maintain optical properties of the light converting film 132, the barrier layer 135 is disposed on the top surface of the light converting film 132 in FIG. 1. When the transparent substrate 131 includes a material into which moisture or oxygen may penetrate, for example, PET, the barrier layer 135 may also be disposed on the bottom surface of the transparent substrate 131.

Each of moisture and oxygen transmission rates of the barrier layer 135 may be equal to or less than, for example, about 0.1 cubic centimeter per square meter per day ($cc/m^2/day$). However, the present embodiment is not limited thereto, and each of the moisture and oxygen transmission rates of the barrier layer 135 may be another value which sufficiently restricts the moisture and the oxygen, respectively.

The barrier material of the barrier layer 135 may include at least one selected from an organic material and an inorganic material. The organic material may include at least one selected from, for example, thiolene, hybrid epoxy, polyurea, polytetrafluoroethylene ("PTFE"), polydimethylsiloxane ("PDMS"), polyvinylchloride, polycarbonate, polystyrene, polyimide, parylene, polyethylacrylate, and polymethylmethacrylate. The inorganic material may include at least one selected from, for example, silicon oxide, aluminum oxide, titanium oxide, indium oxide, tin oxide, tin indium oxide, tantalum oxide, zirconium oxide, and niobium oxide. However, the present embodiment is not limited thereto, and any of various other organic materials or inorganic materials may be used as the barrier material. The barrier layer 135 may have a structure in which at least one organic film and at least one inorganic film alternate in a stack. In this case, the organic film may include epoxy, acrylate, or urethane other than the above organic materials.

When a general or conventional backlight unit that does not include the barrier layer 135 is driven for a long time, for example, 100 hours or more, at a temperature higher than a room temperature, brightness of white light may be reduced by 10% or more, a change ($\Delta C_x$, $\Delta C_y$) in color coordinates may be greater than ($\pm 0.1$, $\pm 0.1$), or a change in a color temperature may be 1000 degrees Kelvin (° K) or more. However, when the backlight unit 100 including the barrier layer 135 whose moisture transmission rate and oxygen transmission rates are each equal to or less than about 0.1 $cc/m^2/day$ is driven for a long time, for example, 100 hours or more, at a temperature higher than a room temperature, brightness of white light may be maintained, a change ($\Delta C_x$, $\Delta C_y$) in color coordinates may be less than ($\pm 0.1$, $\pm 0.1$), and/or a change in a color temperature may be 1000° K or less. Accordingly, even after a relatively long operation, since brightness and color coordinates are not greatly changed, the backlight unit 100 may ensure high reliability.

An adhesive layer (not shown) including the barrier material may be further disposed on a side surface of the light converting layer 130. The adhesive layer may surround side surface of the light converting layer 130. Due to the adhesive layer, edge portions of layers constituting the light converting layer 130 may be considered laminated.

The barrier material included in the adhesive layer reduces or effectively prevents external moisture and/or oxygen from penetrating into the side surface of the light converting layer 130. The adhesive layer may have an uneven (e.g., non-uniform thickness) structure corresponding to the edge portions of the layers constituting the light converting layer 130, or a multi-layer structure which is disposed on a film. The barrier material may include at least one selected from an organic material and an inorganic material. As described above, the organic material may include at least one selected from, for example, thiolene, hybrid epoxy, polyurea, PTFE, PDMS, polyvinylchloride, polycarbonate, polystyrene, polyimide, parylene, polyethylacrylate, and polymethylmethacrylate. The inorganic material may include at least one selected from, for example, silicon oxide, aluminum oxide, titanium oxide, indium oxide, tin oxide, tin indium oxide, tantalum oxide, zirconium oxide, and niobium oxide.

Figure 2:
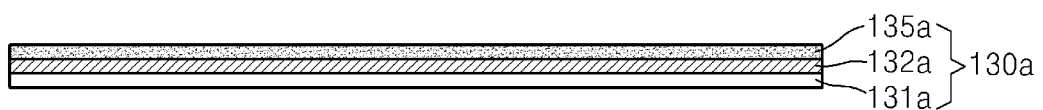
FIG. 2 is a cross-sectional view illustrating another embodiment of a light converting layer of FIG. 1.

FIG. 2 is a cross-sectional view illustrating another embodiment of the light converting layer 130 of FIG. 1. Referring to FIG. 2, a light converting layer 130a may include a transparent substrate 131a, a light converting film 132a that is coated on the transparent substrate 131a and includes semiconductor nanocrystals, and a barrier layer 135a that is disposed on an upper surface of the light converting film 132a and includes a barrier material. The transparent substrate 131a may be a substrate that may reduce or effectively prevent penetration of external moisture or oxygen thereto, such as a glass substrate. In this case, the barrier layer 135a may not be disposed on a bottom surface of the transparent substrate 131a.

Figure 3:
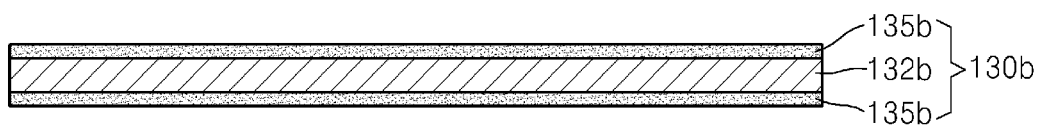
FIG. 3 is a cross-sectional view illustrating another embodiment of the light converting layer of FIG. 1.

FIG. 3 is a cross-sectional view illustrating another embodiment of the light converting layer 130 of FIG. 1. Referring to FIG. 3, a light converting layer 130b may include a light converting film 132b that includes semiconductor nanocrystals, and a barrier layer 135b that is disposed on a surface of the light converting film 132b. In this case, the light converting layer 130b may not include the transparent substrate 131 of FIG. 1. The barrier layer 135b may be disposed on one or both of the upper and lower surfaces of the light converting film 132b.

Figure 5:
FIG. 5 is a cross-sectional view illustrating another embodiment of the light converting layer of FIG. 1.

FIG. 5 is a cross-sectional view illustrating another embodiment of the light converting layer 130 of FIG. 1. Referring to FIG. 5, a light converting layer 130f may include a light converting film 132f that includes semiconductor nanocrystals and a barrier material. The light converting film 132f may be a single-layer film including both the semiconductor nanocrystals and the barrier material. The light converting film 132f of FIG. 5 converts incident light into white light, and reduces or effectively prevents penetration of external moisture and oxygen thereto. Each of moisture and oxygen transmission rates of the light converting film 132f may be equal to or less than, for example, about 0.1 $cc/m^2/day$.

Figure 6:
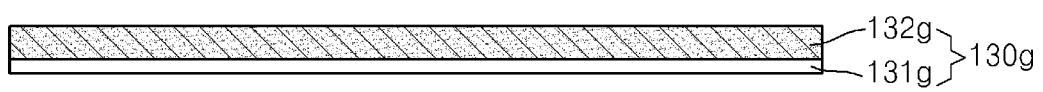
FIG. 6 is a cross-sectional view illustrating another embodiment of the light converting layer of FIG. 1.

FIG. 6 is a cross-sectional view illustrating another embodiment of the light converting layer 130 of FIG. 1. Referring to FIG. 6, a light converting layer 130g may include a transparent substrate 131g, and a light converting film 132g that is disposed on the transparent substrate 131g and includes semiconductor nanocrystals and a barrier material.

Figure 7:
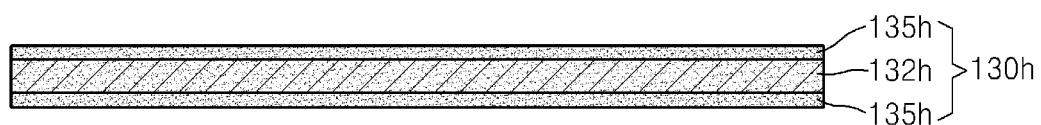
FIG. 7 is a cross-sectional view illustrating another embodiment of the light converting layer of FIG. 1.

FIG. 7 is a cross-sectional view illustrating another embodiment of the light converting layer 130 of FIG. 1. Referring to FIG. 7, a light converting layer 130h may include a light converting film 132h that includes semiconductor nanocrystals and a barrier material, and a barrier layer 135h on a surface of the light converting film 132h and includes a barrier material. The barrier layer 135h may be disposed on one or both of the upper and lower surfaces of the light converting film 132h. The barrier layer 135h may reduce or effectively prevent penetration of moisture or oxygen, and the light converting film 132h may reduce or effectively prevent penetration of the remaining one of moisture and oxygen.

Also, the aforesaid adhesive layer (not shown) may be further disposed on a side surface of each of the above light converting layers.

Figure 8:
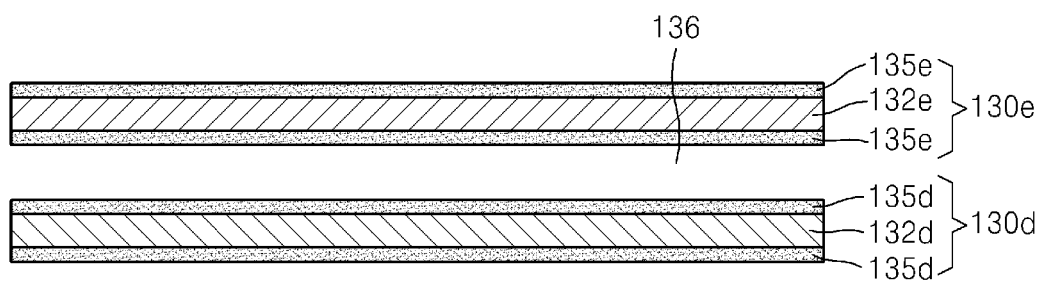
FIG. 8 is a cross-sectional view illustrating another embodiment of the light converting layer of FIG. 1.

FIG. 8 is a cross-sectional view illustrating another embodiment of the light converting layer 130 of FIG. 1. Referring to FIG. 8, the LCD device may include a plurality of light converting layers sequentially disposed in a direction away from the LED light source 110. The plurality of light converting layers may collectively form a light converting member of the LCD device. In detail, first and second light converting layers 130d and 130e are sequentially disposed in a direction away from the LED light source 110.

The first light converting layer 130d may include a first light converting film 132d, and a first barrier layer 135d that is disposed on one or more surface of the first light converting film 132d. The second light converting layer 130e may include a second light converting film 132e, and a second barrier layer 135e that is disposed on one or more surface of the second light converting film 132e.

The first light converting layer 130d and the second light converting layer 130e may be spaced apart from each other in a cross-section direction, and a blank layer 136 may be defined between the first light converting layer 130d and the second light converting layer 130e. The first and second light converting layers 130d and 130e may be disposed to have an emission wavelength with higher energy (that is, a shorter wavelength) as a distance from the LED light source 110 towards the viewing side of the LCD device increases. In one embodiment, for example, when the LED light source 110 is a blue LED light source, the first and second light converting layers 130d and 130e that are sequentially disposed in a direction away from the LED light source 110 may be a red light converting layer and a green light converting layer, respectively.

Alternatively, the LCD device or a light converting member may include three or more sequential light converting layers. The three or more sequential light converting layers may have any of the following arrangement structures. In alternative embodiments, for example, the light converting layers may have an arrangement structure of the LED light source 110—red light converting layer—green light converting layer—red light converting layer—green light converting layer, an arrangement structure of the LED light source 110—green light converting layer—red light converting layer—green light converting layer—red light converting layer, an arrangement structure of the LED light source 110—red light converting layer-orange light converting layer—yellow light converting layer—green light converting layer, or an arrangement structure of the LED light source 110—red+yellow light converting layer—green+orange light converting layer. The arrangement structures of the three or more sequential light converting layers described above are exemplary and the three or more sequential light converting layers may have any of various other arrangement structures.

Referring back to FIG. 1, when light emitted from the LED light source 110 passes through the light converting film 132 including the semiconductor nanocrystals, white light which is a mixture of blue light, green light and red light may be obtained. When compositions and/or sizes of the semiconductor nanocrystals included in the light converting film 132 are changed, blue light, green light and red light may be adjusted at a desired ratio, and thus white light having high color reproducibility and high color purity may be obtained.

A light guide plate 120 may be further disposed between the LED light source 110 and the light converting layer 130. The light guide plate 120 uniformly guides light output from the LED light source 110 toward the light converting layer 130. The light guide plate 120 may include an upper surface as a light emitting surface, a lower surface as a light incident surface, and a plurality of side surfaces connecting the upper and lower surfaces to each other. The surface of the light guide plate 120 which faces the LED light source 110 may be a light incident surface of the light guide plate 120. A diffusive plate 140 may be further disposed between the light converting layer 130 and the liquid crystal panel 500. The diffusive plate 140 diffuses white light incident from the light converting layer 130 and outputs the white light. Accordingly, uniformity of the white light passing through the diffusive plate 140 may be improved.

Figure 4:
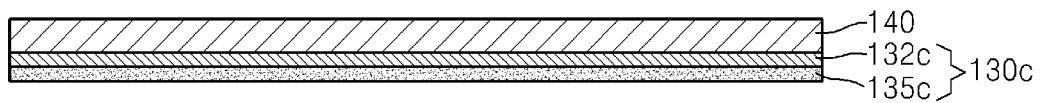
FIG. 4 is a cross-sectional view illustrating another embodiment of the light converting layer of FIG. 1.

Although the diffusive plate 140 and the light converting layer 130 are spaced apart from each other in FIG. 1, the light converting layer 130 may contact a bottom surface of the diffusive plate 140 as shown in FIG. 4. In this case, a light converting layer 130c may include a light converting film 132c that is disposed on the bottom surface of the diffusive plate 140 and includes semiconductor nanocrystals, and a barrier layer 135c that is disposed on a bottom surface of the light converting film 132c and includes a barrier material.

A predetermined optical sheet 150 for improving optical properties such as brightness may be further disposed between the diffusive plate 140 and the liquid crystal panel 500. The optical sheet 150 may include at least one selected from, for example, a prism sheet, a brightness enhancement sheet and a micro-lens sheet. However, the present embodiment is not limited thereto, and the optical sheet 150 may include any number of sheets having various other functions. Alternatively, the optical sheet 150 may be disposed between the LED light source 110 and the light converting layer 130.

White light emitted from the backlight unit 100 is incident on the liquid crystal panel 500. The liquid crystal panel 500 forms an image of a predetermined color by using the white light incident from the backlight unit 100. The liquid crystal panel 500 may have a structure in which a first polarization plate 510, a liquid crystal layer 520, a second polarization plate 530, and a color filter 540 are sequentially disposed. White light emitted from the backlight unit 100 transmits through the first polarization plate 510, the liquid crystal layer 520 and the second polarization plate 530 and then is incident on the color filter 540 to form the image of the predetermined color.

Since the light converting film 132 of the light converting layer 130 includes the semiconductor nanocrystals, the backlight unit 110 constructed as described above may improve color reproducibility and color purity. Since the light converting film 132 is spaced apart from the LED light source 110, deterioration of the semiconductor nanocrystals due to heat generated from the LEDs 112 is reduced or effectively prevented. Also, since the barrier layer 135 is disposed on the light converting film 132, penetration of external moisture and oxygen into the light converting film 132 may be reduced or effectively prevented. Accordingly, when the light converting film 132 converts light incident from the LED light source 110 into white light, optical properties such as a wavelength, a full width at half maximum and quantum efficiency may not be changed, and thus brightness and color coordinates of the backlight unit 100 may be maintained even when the backlight unit 100 is driven for a long time.

Figure 9:
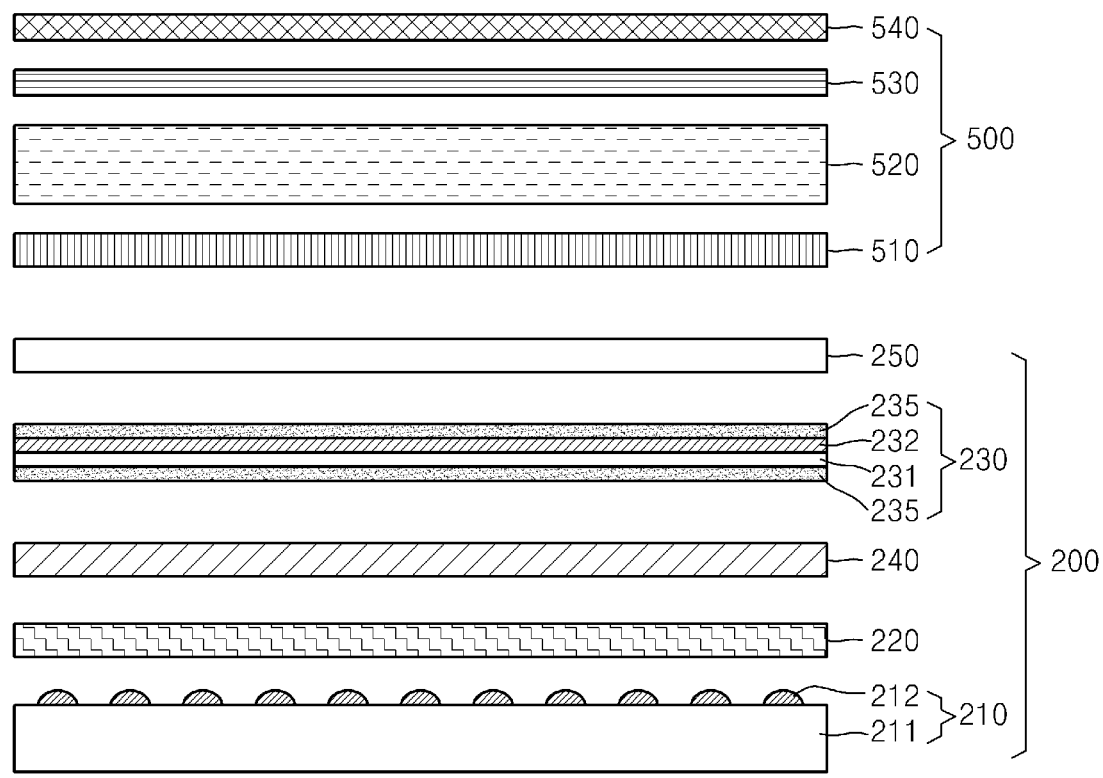
FIG. 9 is a cross-sectional view illustrating another embodiment of an LCD device.

FIG. 9 is a cross-sectional view illustrating another embodiment of an LCD device. The following explanation will focus on a difference from the previous embodiment.

Referring to FIG. 9, a backlight unit 200 includes an LED light source 210, and a light converting layer 230. The light converting layer 230 converts light incident from the LED light source 210 into white light and outputs the white light to the liquid crystal panel 500. The light converting layer 230 is disposed between the LED light source 210 and the liquid crystal panel 500, and is spaced apart from the LED light source 210. The LED light source 210 may be a light source that emits blue light, or the LED light source 210 may be a light source that emits ultraviolet light. The LED light source 210 may include a substrate 211, and a plurality of LEDs 212 that is disposed at predetermined intervals on the substrate 211.

The light converting layer 230 may include a transparent substrate 231, a light converting film 232 that is disposed such as by coating on the transparent substrate 231 and includes semiconductor nanocrystals, and a barrier layer 235 that is disposed on a top surface of the light converting film 232 and includes a barrier material. The transparent substrate 231 may include, but is not limited to, a resin such as PET. The barrier layer 235 reduces or effectively prevents external moisture and/or oxygen from penetrating into the light converting film 232 as described above. When the transparent substrate 231 includes a material into which moisture or oxygen may penetrate such as PET, the barrier layer 235 may also be disposed on the bottom surface of the transparent substrate 231.

Each of moisture and oxygen transmission rates of the barrier layer 235 may be, but is not limited to, equal to or less than about 0.1 cc/m$^2$/day. The barrier material of the barrier layer 235 may include at least one selected from an organic material and an inorganic material. The organic material may include at least one selected from, for example, thiolene, hybrid epoxy, polyurea, PTFE, PDMS, polyvinylchloride, polycarbonate, polystyrene, polyimide, parylene, polyethylacrylate, and polymethylmethacrylate. The inorganic material may include at least one selected from, for example, silicon oxide, aluminum oxide, titanium oxide, indium oxide, tin oxide, tin indium oxide, tantalum oxide, zirconium oxide, and niobium oxide. However, the present embodiment is not limited thereto, and any of various other organic materials or inorganic materials may be used as the barrier material. The barrier layer 235 may have a structure in which at least one organic film and at least one inorganic film alternate in a stack.

Alternatively, any of the light converting layers shown in FIGS. 2, 3 and 5-7 may be used as the light converting layer 230 shown in FIG. 9. As shown in FIG. 2, the light converting layer 130a as the light converting layer 230 may include the transparent substrate 131a, the light converting film 132a that is coated on the transparent substrate 131a and includes semiconductor nanocrystals, and the barrier layer 135a that is disposed on the light converting film 132a. In this case, since the transparent substrate 131a is a substrate that may reduce or effectively prevent penetration of external moisture or oxygen, the barrier layer 135a may be disposed on only a top surface of the light converting film 132a.

As shown in FIG. 3, the light converting layer 130b as the light converting layer 230 may include the light converting film 132b that includes semiconductor nanocrystals, and the barrier layer 135b that is disposed on one or more surface of the light converting film 132b. As shown in FIG. 5, the light converting layer 130f as the light converting layer 230 may convert incident light into white light, and may reduce or effectively prevent penetration of external moisture and oxygen thereto. Each of moisture and oxygen transmission rates of the light converting film 132f may be equal to or less than, for example, about 0.1 cc/m$^2$/day. As shown in FIG. 6, the light converting layer 130g as the light converting layer 230 may include the transparent substrate 131g, and the light converting film 132g that is disposed on the transparent substrate 131g and includes semiconductor nanocrystals and a barrier material. As shown in FIG. 7, the light converting layer 130h as the light converting layer 230 may include a light converting film 132h that includes semiconductor nanocrystals and a barrier material, and the barrier layer 135h that is disposed on one or more surface of the light converting film 132h and includes a barrier material. The barrier layer 135h may reduce or effectively prevent penetration of moisture or oxygen thereto, and the light converting film 132h may reduce or effectively prevent penetration of the remaining one of moisture and oxygen.

Alternatively, the LCD device shown in FIG. 9 may further include a plurality of light converting layers sequentially disposed in a direction away from the LED light source 210, for example, as shown in FIG. 8. The plurality of light converting layers may be spaced apart from one another, and a blank layer may be defined between the light converting layers. The plurality of light converting layers may be disposed to have an emission wavelength with higher energy (that is, a shorter wavelength) as a distance from the LED light source 210 increases. Arrangement structures of the plurality of light converting layers may be variously modified as described above.

An adhesive layer (not shown) including the barrier material may be further disposed on a side surface of the light converting layer 230. The adhesive layer may surround the side surface of the light converting layer 230. Due to the adhesive layer, edge portions of layers constituting the light converting layer 230 may be considered laminated. A barrier material included in the adhesive layer reduces or effectively prevents external moisture and/or oxygen from penetrating into the side surface of the light converting layer 230. The adhesive layer may have an uneven structure corresponding to the edge portions of the layers constituting the light converting layer 230, or a multi-layer structure disposed on a film.

A diffusive plate 240 is disposed between the LED light source 210 and the light converting layer 230. When light emitted from the LED light source 210 transmits through the diffusive plate 240, uniformity of the light may be improved. The light passing through the diffusive plate 240 is incident on the light converting layer 230 and is converted into white light. Although the diffusive plate 240 and the light converting layer 230 are spaced apart from each other in FIG. 9, the light converting layer 230 may contact a top surface of the diffusive plate 240.

A light guide plate 220 may be further disposed between the LED light source 210 and the diffusive plate 240.

A predetermined optical sheet 250 for improving optical properties such as brightness may be further disposed between the light converting layer 230 and the liquid crystal panel 500. Alternatively, the optical sheet 250 may be disposed between the LED light source 210 and the light converting layer 230.

Figure 10:
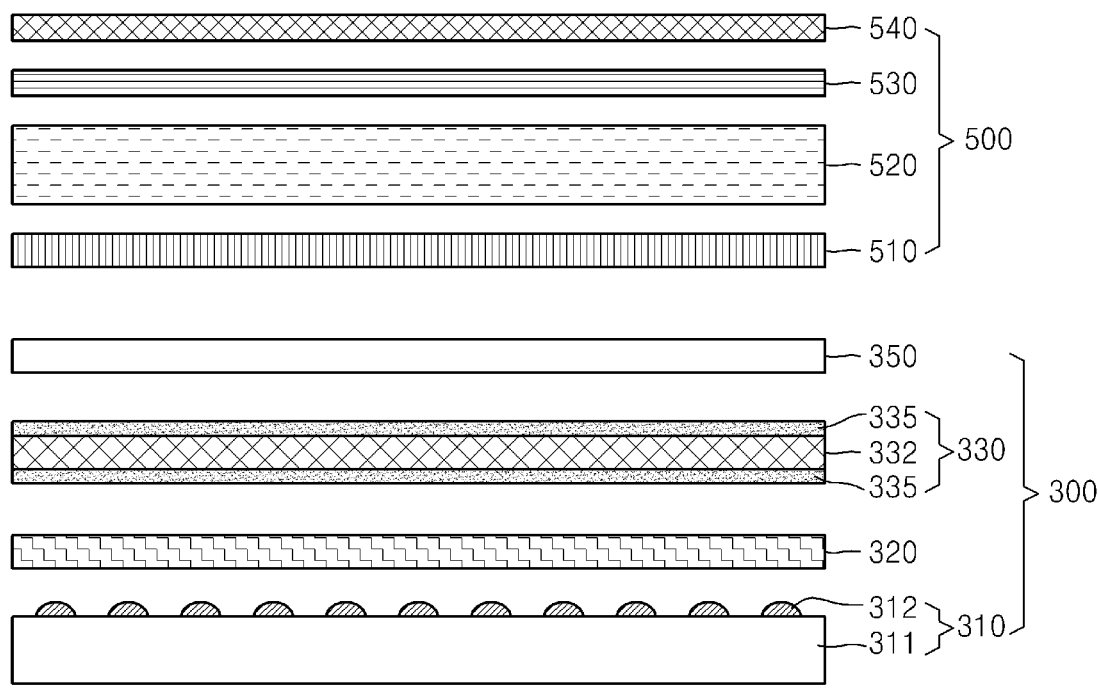
FIG. 10 is a cross-sectional view illustrating another embodiment of an LCD device.

FIG. 10 is a cross-sectional view illustrating another embodiment of an LCD device. The following explanation will focus on a difference from the previous embodiments.

Referring to FIG. 10, the LCD device includes a backlight unit 300, and a liquid crystal panel 500 that forms an image of a predetermined color by using white light emitted from the backlight unit 300. The backlight unit 300 includes an LED light source 310, and a light converting layer 330 that is spaced apart from the LED light source 310. The LED light source 310 may include a substrate 311, and a plurality of LEDs 312 that is disposed at predetermined intervals on the substrate 311. The LED light source 310 may be a light source that emits blue light, or a light source that emits ultraviolet light.

The light converting layer 330 includes a light-converting diffusive film 332 that includes semiconductor nanocrystals for converting incident light into white light and light diffusing particles for diffusing incident light, and a barrier layer 335 that is disposed on one or more surface of the light-converting diffusive film 332. Each of the LED light source 310 and the light converting layer 330 may have a planar size corresponding to the liquid crystal panel 500.

The light-converting diffusive film 332 may perform both a light conversion function and a light diffusion function. The semiconductor nanocrystals may include at least one selected from a Group II-VI material, a Group III-V material, and a Group IV element. As is further disclosed above, the Group II-VI material may include at least one selected from HgTe, HgSe, HgS, CdTe, CdSe, Cds, ZnTe, ZnSe, and ZnS, the Group III-V material may include at least one selected from GaN, GaP, InN, InP, and InAs, and the Group IV element may include at least one selected from Si and Ge. The materials are exemplarily described as materials of the semiconductor nanocrystals, and other various semiconductor materials may be used as materials for the semiconductor nanocrystals.

The barrier layer 335 reduces or effectively prevents external moisture and/or oxygen from penetrating into the light-converting diffusive film 332. Each of moisture and oxygen transmission rates of the barrier layer 335 may be, but is not limited to, equal to or less than about 0.1 $cc/m^2/day$.

A barrier material of the barrier layer 335 may include at least one selected from an organic material and an inorganic material. The barrier layer 335 may have a multi-layer structure in which at least one organic film and at least one inorganic film alternate in a stack. An adhesive layer (not shown) including the barrier material may be further disposed on a side surface of the light converting layer 330. The adhesive layer may surround the side surface of the light converting layer 330. Due to the adhesive layer, edge portions of layers constituting the light converting layer 330 may be considered laminated.

Figure 11:
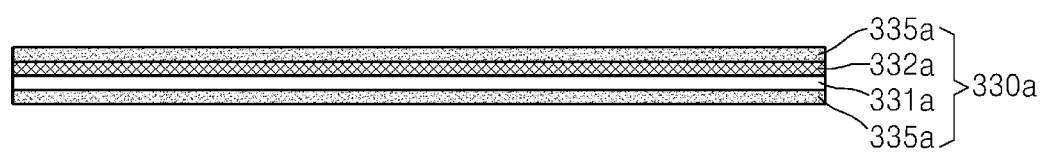
FIG. 11 is a cross-sectional view illustrating an embodiment of a light-converting diffusive layer of FIG. 10.

FIG. 11 is a cross-sectional view illustrating another embodiment of the light converting layer 330 of FIG. 10. Referring to FIG. 11, a light converting layer 330a may include a transparent substrate 331a, a light-converting diffusive film 332a that is coated on the transparent substrate 331a and includes semiconductor nanocrystals and light diffusing particles, and a barrier layer 335a that is disposed on a top surface of the light-converting diffusive film 332a. When the transparent substrate 331a includes a material into which moisture or oxygen may penetrate such as PET, the barrier layer 335a may also be disposed on the bottom surface of the transparent substrate 331a.

Figure 12:
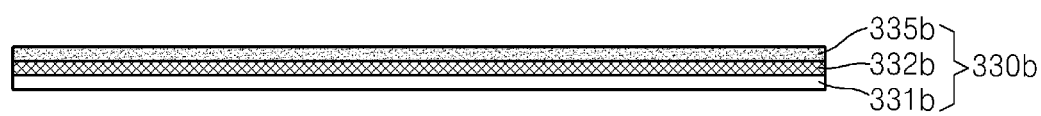
FIG. 12 is a cross-sectional view illustrating another embodiment of the light-converting diffusive layer of FIG. 10.

FIG. 12 is a cross-sectional view illustrating another embodiment of the light converting layer 330 of FIG. 10. Referring to FIG. 12, a light converting layer 330b may include a transparent substrate 331b, a light-converting diffusive film 332b that is coated on the transparent substrate 331b and includes semiconductor nanocrystals and light diffusing particles, and a barrier layer 335b that is disposed on a top surface of the light-converting diffusive film 332b. The transparent substrate 331b may be a substrate that reduces or effectively prevents penetration of external moisture or oxygen such as a glass substrate. In this case, the barrier layer 335b may be disposed on only the top surface of the light-converting diffusive film 332b.

Figure 13:
FIG. 13 is a cross-sectional view illustrating another embodiment of the light-converting diffusive layer of FIG. 10.

FIG. 13 is a cross-sectional view illustrating another embodiment of the light converting layer 330 of FIG. 10. Referring to FIG. 13, a light converting layer 330e may include a light-converting diffusive film 332e that includes semiconductor nanocrystals for converting incident light into white light, light diffusing particles for diffusing incident light, and a barrier material for reducing or effectively preventing penetration of external moisture and/or oxygen thereto. The light-converting diffusive film 332e may be a single-layer film including the semiconductor nanocrystals, the light diffusing particles and the barrier material.

Figure 14:
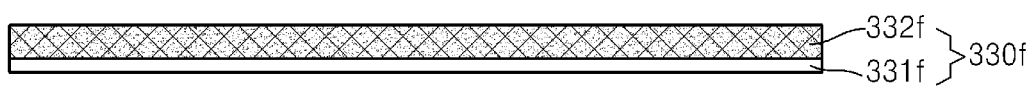
FIG. 14 is a cross-sectional view illustrating another embodiment of the light-converting diffusive layer of FIG. 10.

FIG. 14 is a cross-sectional view illustrating another embodiment of the light converting layer 330 of FIG. 10. Referring to FIG. 14, a light converting layer 330f may include a transparent substrate 331f, and a light-converting diffusive film 332f that is disposed on the transparent substrate 331f and includes semiconductor nanocrystals, light diffusing particles and a barrier material.

Figure 15:
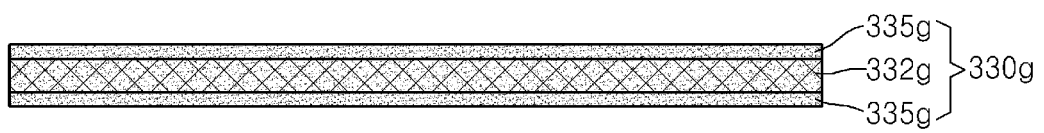
FIG. 15 is a cross-sectional view illustrating another embodiment of the light-converting diffusive layer of FIG. 10.

FIG. 15 is a cross-sectional view illustrating another embodiment of the light converting layer 330 of FIG. 10. Referring to FIG. 15, a light converting layer 330g may include a light-converting diffusive film 332g that includes semiconductor nanocrystals, light diffusing particles and a barrier material, and a barrier layer 335g that is disposed on one or more surface of the light-converting diffusive film 332g and includes a barrier material. In this case, the barrier layer 335g may reduce or effectively prevent penetration of moisture or oxygen, and the light-converting diffusive film 332g may reduce or effectively prevent penetration of the remaining one of moisture and oxygen.

Figure 16:
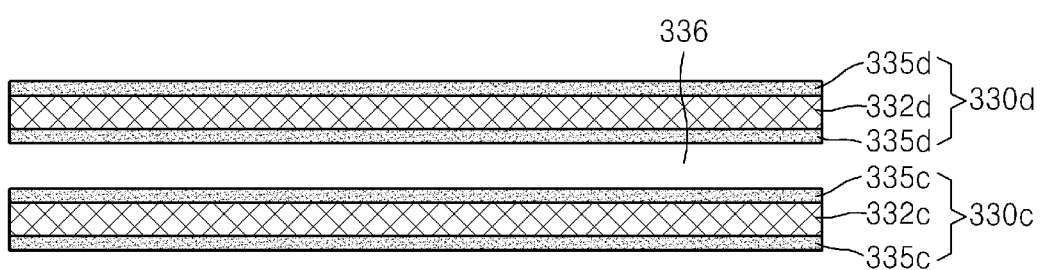
FIG. 16 is a cross-sectional view illustrating another embodiment of the light-converting diffusive layer of FIG. 10.

FIG. 16 is a cross-sectional view illustrating another embodiment of the light converting layer 330 of FIG. 10. Referring to FIG. 16, the LCD device may include a plurality of light converting layers sequentially disposed in a direction away from the LED light source 310. In detail, first and second light converting layers 330c and 330d are sequentially disposed in a direction away from the LED light source 310.

The first light converting layer 330c may include a first light-converting diffusive film 332c, and a first barrier layer 335c that is disposed on one or more surface of the first light-converting diffusive film 332c. The second light converting layer 330d may include a second light-converting diffusive film 332d, and a second barrier layer 335d that is disposed on one or more surface of the second light-converting diffusive film 332d.

The first light converting layer 330c and the second light converting layer 330d may be spaced apart from each other, and a blank layer 336 may be defined between the first light converting layer 330c and the second light converting layer 330d. The first and second light converting layers 330c and 330d may be disposed to have an emission wavelength with higher energy (that is, a shorter wavelength) as a distance from the LED light source 310 increases. In one embodiment, for example, when the LED light source 310 is a blue LED light source, the first and second light converting layers 330c and 330d which are sequentially disposed in a direction away from the LED light source 310 may be a red light converting layer and a green light converting layer, respectively.

Alternatively, the LCD device or a light converting member of the LCD device may include three or more sequential light converting layers. The three or more light converting layers may have any of the following arrangement structures. In alternative embodiments, for example, the light converting layers may have an arrangement structure of the LED light source 310—red light converting layer—green light converting layer—red light converting layer—green light converting layer, an arrangement structure of the LED light source 310—green light converting layer—red light converting layer—green light converting layer—red light converting layer, an arrangement structure of the LED light source 310—red light converting layer-orange light converting layer—yellow light converting layer—green light converting layer, or an arrangement structure of the LED light source 310—red+yellow light converting layer—green+orange light converting layer. The aforesaid arrangement structures of the three or more sequential light converting layers are exemplary, and the three or more sequential light converting layers may have any of various other arrangement structures.

Referring back to FIG. 10, when light emitted from the LED light source 310 passes through the light-converting diffusive film 332 that includes the semiconductor nanocrystals and the light diffusing particles, white light that is a mixture of blue light, green light and red light may be obtained. When compositions and/or sizes of the semiconductor nanocrystals included in the light-converting diffusive film 332 are changed, the blue light, the green light and the red light may be adjusted at a desired ratio, and thus white light having high color reproducibility and high color purity may be obtained.

A light guide plate 320 may be further disposed between the LED light source 310 and the light converting layer 330. The light guide plate 320 uniformly guides light output from the LED light source 310 toward the light converting layer 330.

A predetermined optical sheet 350 for improving optical properties such as brightness may be further disposed between the light converting layer 330 and the liquid crystal panel 500. The optical sheet 350 may include, but is not limited to, at least one selected from, for example, a prism sheet, a brightness enhancement sheet and a micro-lens sheet. Alternatively, the optical sheet 350 may be disposed between the LED light source 310 and the light converting layer 330.

White light emitted from the backlight unit 300 is incident on the liquid crystal panel 500. The liquid crystal panel 500 forms an image of a predetermined color by using the white light incident from the backlight unit 300. The liquid crystal panel 500 may have a structure in which a first polarization plate 510, a liquid crystal layer 520, a second polarization plate 530 and a color filter 540 are sequentially disposed. The white light emitted from the backlight unit 300 transmits through the first polarization plate 510, the liquid crystal layer 520 and the second polarization plate 530, and then is incident on the color filter 540, to form the image of the predetermined color.

Figure 17:
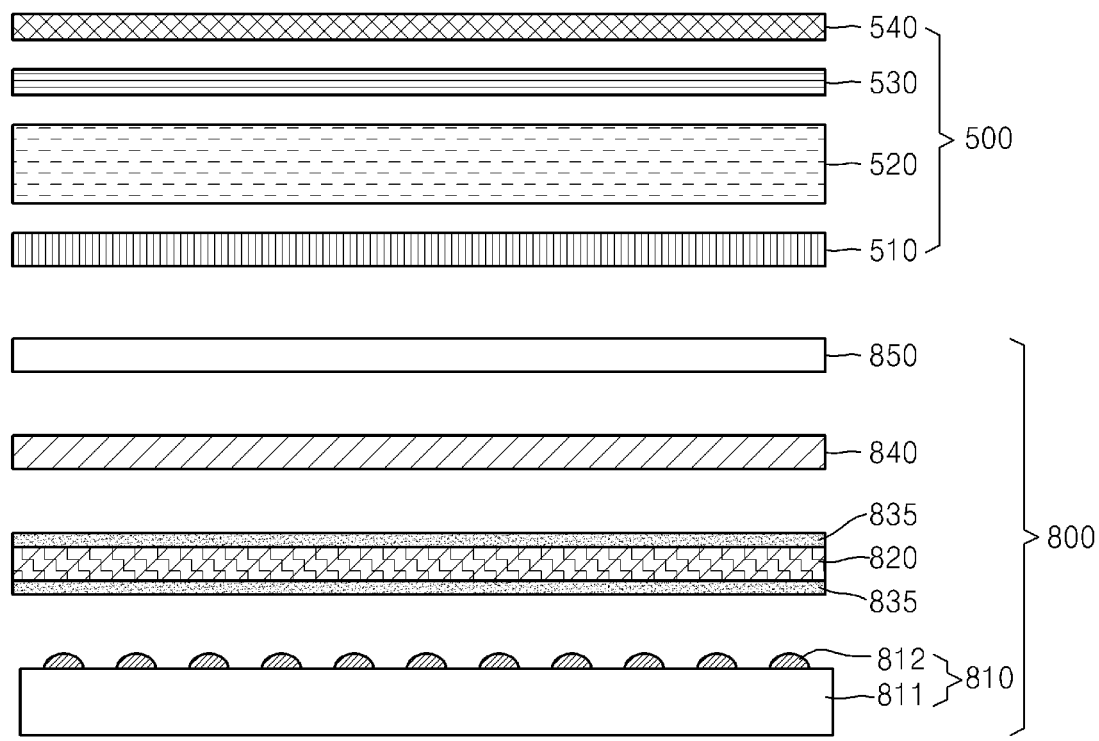
FIG. 17 is a cross-sectional view illustrating another embodiment of an LCD device.

FIG. 17 is a cross-sectional view illustrating another embodiment of an LCD device. The following explanation will focus on a difference from the previous embodiments.

Referring to FIG. 17, the LCD device includes a backlight unit 800, and the liquid crystal panel 500 that forms an image of a predetermined color by using white light emitted from the backlight unit 800. The backlight unit 800 includes an LED light source 810, a light guide plate 820 that is disposed between the LED light source 810 and the liquid crystal panel 500, and a barrier layer 835 that is disposed on one or more surface of the light guide plate 820.

The LED light source 810 may include a substrate 811, and a plurality of LEDs 812 that is disposed at predetermined intervals on the substrate 811. The LED light source 810 may be a light source that emits blue light, or a light source that emits ultraviolet light.

The light guide plate 820 that guides light incident from the LED light source 810 toward the liquid crystal panel 500 may include semiconductor nanocrystals. Accordingly, the light guide plate 820 converts incident light into white light and guides the white light toward the liquid crystal panel 500. The barrier layer 835 is disposed on one or more surface of the light guide plate 820, and reduces or effectively prevents external moisture and/or oxygen from penetrating into the light guide plate 820. Each of moisture and oxygen transmission rates of the barrier layer 835 may be equal to or less than, for example, about 0.1 cc/m$^2$/day. However, the present embodiment is not limited thereto, and each of moisture and oxygen transmission rates of the barrier layer 835 may be another value which sufficiently restricts the moisture and the oxygen, respectively.

A barrier material of the barrier layer 835 may include at least one selected from an organic material and an inorganic material. The organic material may include at least one selected from, for example, thiolene, hybrid epoxy, polyurea, PTFE, PDMS, polyvinylchloride, polycarbonate, polystyrene, polyimide, parylene, polyethylacrylate, and polymethylmethacrylate. The inorganic material may include at least one selected from, for example, silicon oxide, aluminum oxide, titanium oxide, indium oxide, tin oxide, tin indium oxide, tantalum oxide, zirconium oxide, and niobium oxide. However, the present embodiment is not limited thereto, and any of various other organic materials or inorganic materials may be used as the barrier material. The barrier layer 835 may have a structure in which at least one organic film and at least one inorganic film alternate in a stack.

An adhesive layer (not shown) including the barrier material may be further disposed on a side surface of the light guide plate 820. The adhesive layer may surround the side surface of the light guide plate 820. The barrier material included in the adhesive layer reduces or effectively prevents external moisture and/or oxygen from penetrating into the side surface of the light guide plate 820. The barrier material may include at least one selected from an organic material and an inorganic material.

A diffusive plate 840 may be further disposed between the light guide plate 820 and the liquid crystal panel 500. Since the diffusive plate 840 diffuses white light incident from the light guide plate 820 and outputs the white light, uniformity of the white light passing through the diffusive plate 840 may be improved.

A predetermined optical sheet 850 for improving optical properties such as brightness may be further disposed between the diffusive plate 840 and the liquid crystal panel 500. The optical sheet 850 may include, but is not limited to, at least one selected from a prism sheet, a brightness enhancement sheet or a micro-lens sheet.

Figure 18:
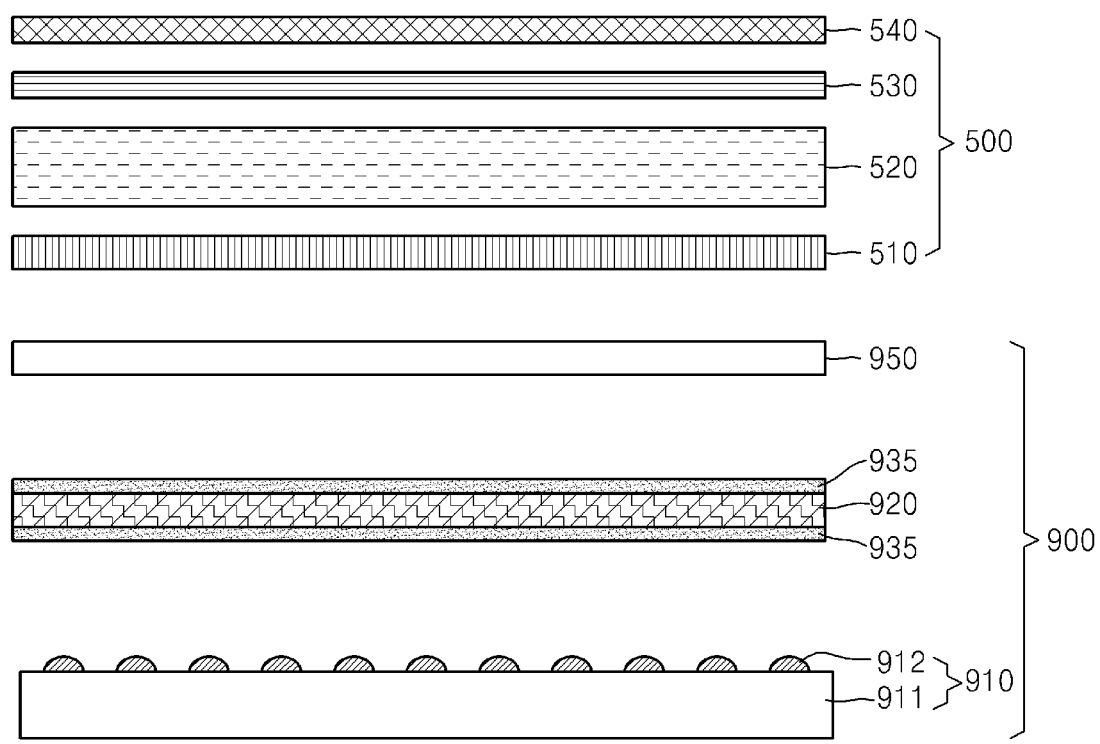
FIG. 18 is a cross-sectional view illustrating another embodiment of an LCD device.

FIG. 18 is a cross-sectional view illustrating another embodiment of an LCD device. The following explanation will focus on a difference from the previous embodiments.

Referring to FIG. 18, the LCD device includes a backlight unit 900, and a liquid crystal panel 500 that forms an image of a predetermined color by using white light emitted from the backlight unit 900. The backlight unit 900 includes an LED light source 910, a light guide plate 920 that is disposed between the LED light source 910 and the liquid crystal panel 500, and a barrier layer 935 that is disposed on one or more surface of the light guide plate 920.

The LED light source 910 may include a substrate 911, and a plurality of LEDs 912 that is disposed at predetermined intervals on the substrate 911. The LED light source 910 may be a light source that emits blue light, or a light source that emits ultraviolet light.

The light guide plate 920 that guides light incident from the LED light source 910 toward the liquid crystal panel 500 may include semiconductor nanocrystals and light diffusing particles. Accordingly, the light guide plate 920 may convert incident light into white light, diffuse the white light and guide the diffused white light toward the liquid crystal panel 500.

An adhesive layer (not shown) including a barrier material may be further disposed on a side surface of the light guide plate 920.

A predetermined optical sheet 950 for improving optical properties such as brightness may be further disposed between the light guide plate 920 and the liquid crystal panel 500. The optical sheet 950 may include, but is not limited to, at least one selected from a prism sheet, a brightness enhancement sheet or a micro-lens sheet.

Figure 19:
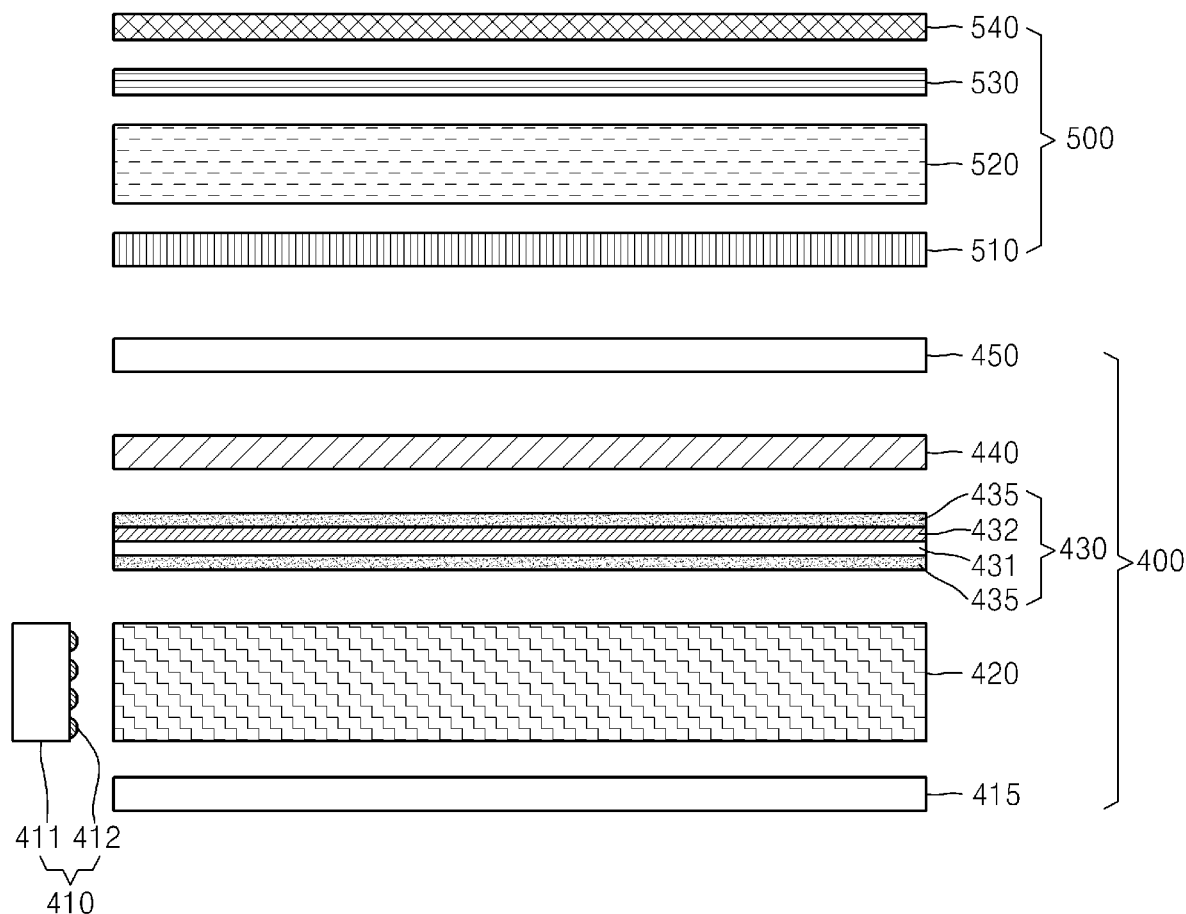
FIG. 19 is a cross-sectional view illustrating another embodiment of an LCD device.

FIG. 19 is a cross-sectional view illustrating another embodiment of an LCD device.

Referring to FIG. 19, the LCD device includes a backlight unit 400, and the liquid crystal panel 500 that forms an image of a predetermined color by using white light emitted from the backlight unit 400. The backlight unit 400 includes an LED light source 410, a light guide plate 420 that uniformly guides light emitted from the LED light source 410 toward the liquid crystal panel 500, and a light converting layer 430 that converts light emitted from the light guide plate 420 into white light.

The LED light source 410 may be disposed on one or more side of the light guide plate 420. The light guide plate 420 may include an upper surface as a light emitting surface, a lower surface as a rear transmitting or reflecting surface, and a plurality of side surfaces connecting the upper and lower surfaces to each other. One more of the side surfaces which faces the LED light source 410 may be a light incident surface of the light guide plate 420.

The LED light source 410 may include a substrate 411, and a plurality of LEDs 412 that is disposed at predetermined intervals on the substrate 411. The LED light source 410 may be a light source that emits blue light, or a light source that emits ultraviolet light. A reflective plate 415 for reflecting light output from the light guide plate 420 to the liquid crystal panel 500 may be further disposed under the light guide plate 420.

The light converting layer 430 converts light incident from the light guide plate 420 into white light, and emits the white light to the liquid crystal panel 500. The light converting layer 430 may have a planar size corresponding to the liquid crystal panel 500. The light converting layer 430 may include a transparent substrate 431, a light converting film 432 that is disposed such as by coating on the transparent substrate 431 and includes semiconductor nanocrystals, and a barrier layer 435 that is disposed on a top surface of the light converting film 432 and includes a barrier material.

The light converting film 432 may include semiconductor nanocrystals that may ensure high color reproducibility and high color purity. The light converting film 432 may be, for example, a polymer film in which the semiconductor nanocrystals are dispersed. The barrier layer 435 may be disposed on the top surface of the light converting film 432. The barrier layer 435 reduces or effectively prevents external moisture and/or oxygen from penetrating into the light converting film 432. When the transparent substrate 431 includes of a material in which moisture or oxygen may penetrate such as PET, the barrier layer 435 may also be disposed on the bottom surface of the transparent substrate 431.

Each of moisture and oxygen transmission rates of the barrier layer 435 may be equal to or less than, for example, about 0.1 cc/m$^2$/day. The present embodiment is not limited thereto, and each of moisture and oxygen transmission rates of the barrier layer 435 may be another value which sufficiently restricts the moisture and the oxygen, respectively.

The barrier material of the barrier layer 435 may include at least one selected from an organic material and an inorganic material. The organic material may include at least one selected from, for example, thiolene, hybrid epoxy, polyurea, PTFE, PDMS, polyvinylchloride, polycarbonate, polystyrene, polyimide, parylene, polyethylacrylate, and polymethylmethacrylate. The inorganic material may include at least one selected from, for example, silicon oxide, aluminum oxide, titanium oxide, indium oxide, tin oxide, tin indium oxide, tantalum oxide, zirconium oxide, and niobium oxide. However, the present embodiment is not limited thereto, and any of various other organic materials or inorganic materials may be used as the barrier material. The barrier layer 435 may have a structure in which at least one organic film and at least one inorganic film alternate in a stack.

When a general or conventional backlight unit that does not include the barrier layer 435 is driven for a long time, for example, 100 hours or more, at a temperature higher than a room temperature, brightness of white light may be reduced by 10% or more, a change ($\Delta C_x$, $\Delta C_y$) in color coordinates may be greater than (±0.1, ±0.1), or a change in a color temperature may be 1000° K or more. However, when the backlight unit 400 including the barrier layer 435 whose moisture transmission rate and oxygen transmission rates are each equal to or less than about 0.1 cc/m$^2$/day is driven for a long time, for example, 100 hours or more, at a temperature higher than a room temperature, brightness of white light may be maintained, a change ($\Delta C_x$, $\Delta C_y$) in color coordinates may be less than (±0.1, ±0.1), and/or a change in a color temperature may be 1000° K or less.

Various modified examples of the light converting layer 430 are illustrated in FIGS. 2, 3, 5, 6 and 7, and a detailed explanation thereof has already been made and thus will not be repeated here. The LCD device of FIG. 19 may further include a plurality of light converting layers sequentially disposed in a direction away from the LED light source 410 and/or the light guide plate 420. The light converting layers may be spaced apart from one another, and a blank layer may be defined between the plurality of light converting layers. The plurality of light converting layers may be disposed to have an emission wavelength with higher energy (that is, a shorter wavelength) as a distance from the LED light source 410 and/or the light guide plate 420 increases. Arrangement structures of the plurality of light converting layers may be variously modified as described above.

An adhesive layer (not shown) including the barrier material may be further disposed on a side surface of the light converting layer 430. The adhesive layer may surround the side surface of the light converting layer 430. Due to the adhesive layer, edge portions of layers constituting the light converting layer 430 may be considered laminated. The barrier material included in the adhesive layer reduces or effectively prevents external moisture and/or oxygen from penetrating into the side surface of the light converting layer 430. The adhesive layer may have an uneven structure corresponding to the edge portions of the layers constituting the light converting layer 430, or a multi-layer structure disposed on a film. The barrier material may include at least one selected from an organic material and an inorganic material.

When light emitted from the LED light source 410 passes through the light guide plate 420 and the light converting film 432, white light that is a mixture of blue light, green light and red light may be obtained. When compositions and/or sizes of the semiconductor nanocrystals included in the light converting film 432 are changed, the blue light, the green light and the red light may be adjusted at a desired ratio, and thus white light having high color reproducibility and high color purity may be obtained.

A diffusive plate 440 may be further disposed between the light converting layer 430 and the liquid crystal panel 500. The diffusive plate 440 diffuses white light incident from the light converting layer 430 and outputs the white light. Accordingly, uniformity of the white light passing through the diffusive plate 440 may be improved. Although the diffusive plate 440 and the light converting layer 430 are spaced apart from each other in FIG. 19, the light converting layer 430 may contact a bottom surface of the diffusive plate 440.

A predetermined optical sheet 450 for improving optical properties such as brightness may be further disposed between the diffusive plate 440 and the liquid crystal panel 500. The optical sheet 450 may include, but is not limited to, at least one selected from a prism sheet, a brightness enhancement sheet and a micro-lens sheet.

Figure 20:
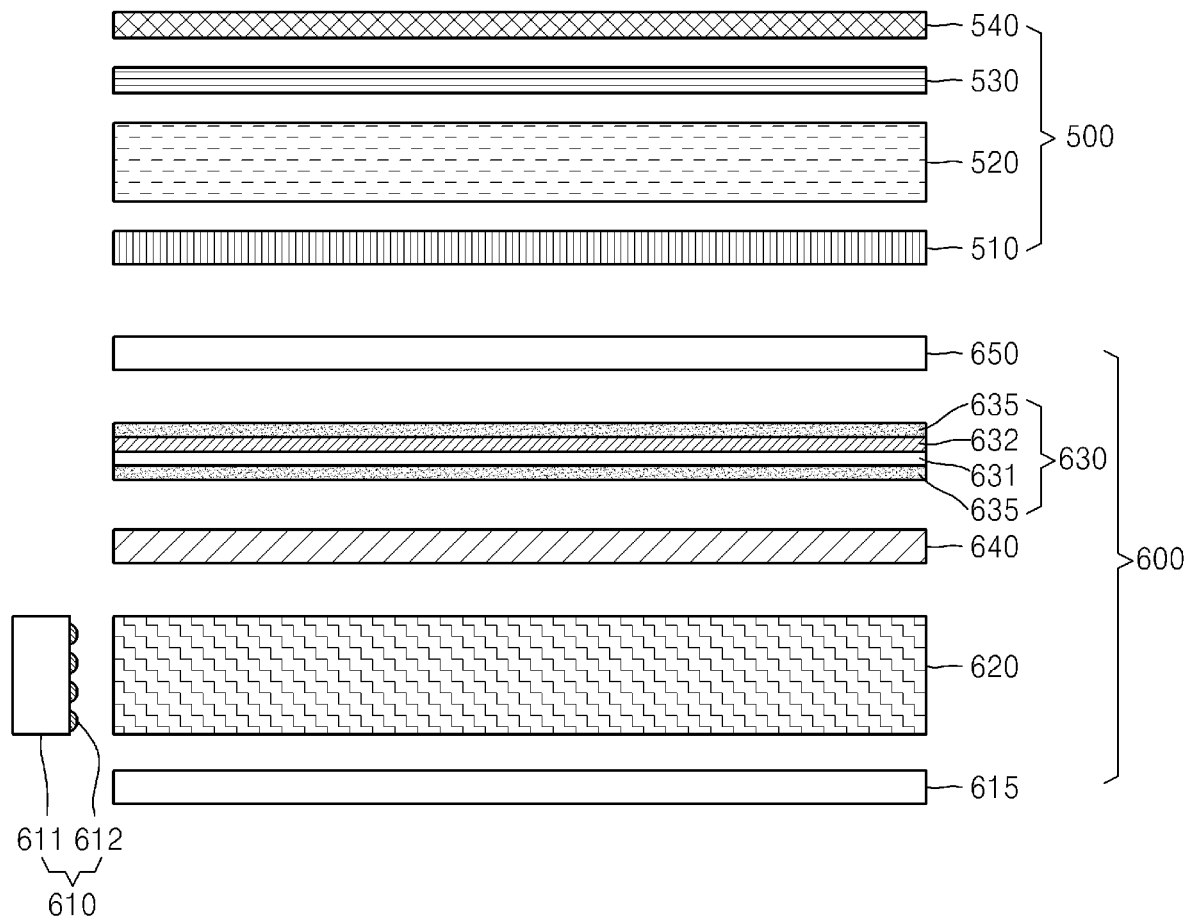
FIG. 20 is a cross-sectional view illustrating another embodiment of an LCD device.

FIG. 20 is a cross-sectional view illustrating another embodiment of an LCD device. The following explanation will focus on a difference from the previous embodiments.

Referring to FIG. 20, the LCD device includes a backlight unit 600, and a liquid crystal panel 500 that forms an image of a predetermined color by using white light emitted from the backlight unit 600. The backlight unit 600 includes an LED light source 610, a light guide plate 620 that uniformly guides light emitted from the LED light source 610 toward the liquid crystal panel 500, and a light converting layer 630 that converts light emitted from the light guide plate 620 into white light.

The LED light source 610 may be disposed on one or more side of the light guide plate 620, and a reflective plate 615 may be further disposed under the light guide plate 620. The LED light source 610 may be a light source that emits blue light, or a light source that emits ultraviolet light. The LED light source 610 may include a substrate 611, and a plurality of LEDs 612 that is disposed at predetermined intervals on the substrate 611.

The light converting layer 630 which converts light incident from the LED light source 610 into white light is disposed between the light guide plate 620 and the liquid crystal panel 500. The light converting layer 630 may include a transparent substrate 631, a light converting film 632 that is coated on the transparent substrate 631 and includes semiconductor nanocrystals, and a barrier layer 635 that is disposed on a top surface of the light converting film 632. The barrier layer 635 reduces or effectively prevents external moisture and/or oxygen from penetrating into the light converting film 632. When the transparent substrate 631 includes a material into which moisture or oxygen may penetrate such as PET, the barrier layer 635 may also be disposed on the bottom surface of the transparent substrate 631.

Each of moisture and oxygen transmission rates of the barrier layer 635 may be, but is not limited to, equal to or less than about 0.1 $cc/m^2/day$. A barrier material of the barrier layer 635 may include at least one selected from an organic material and an inorganic material. The barrier layer 635 may have a structure in which at least one organic film and at least one inorganic film alternate in a stack.

Various modified examples of the light converting layer 630 are illustrated in FIGS. 2, 3, 5, 6 and 7, and a detailed explanation thereof has already been made and thus will not be repeated here. The LCD device of FIG. 20 may further include a plurality of light converting layers sequentially disposed in a direction away from the LED light source 610 and/or the light guide plate 620. The plurality of light converting layers may be spaced apart from one another, and a blank layer may be defined between the plurality of light converting layers. The plurality of light converting layers may be disposed to have an emission wavelength with higher energy (that is, a shorter wavelength) as a distance from the LED light source 610 and/or the light guide plate 620 increases. Arrangement structures of the plurality of light converting layers may be variously modified as described above.

An adhesive layer (not shown) including the barrier material may be further disposed on a side surface of the light converting layer 630. The adhesive layer may surround the side surface of the light converting layer 630. The barrier material may include at least one selected from an organic material and an inorganic material.

A diffusive plate 640 may be further disposed between the LED light source 610 and the light converting layer 630. Uniformity of light emitted from the LED light source 610 may be improved while passing through the diffusive plate 640, and the light passing through the diffusive plate 640 may be incident on the light converting layer 630 may be converted into white light. Although the diffusive plate 640 and the light converting layer 630 are spaced apart from each other in FIG. 12, the light converting layer 630 may contact a top surface of the diffusive plate 640.

A predetermined optical sheet 650 for improving optical properties such as brightness may be further disposed between the light converting layer 630 and the liquid crystal panel 500.

Figure 21:
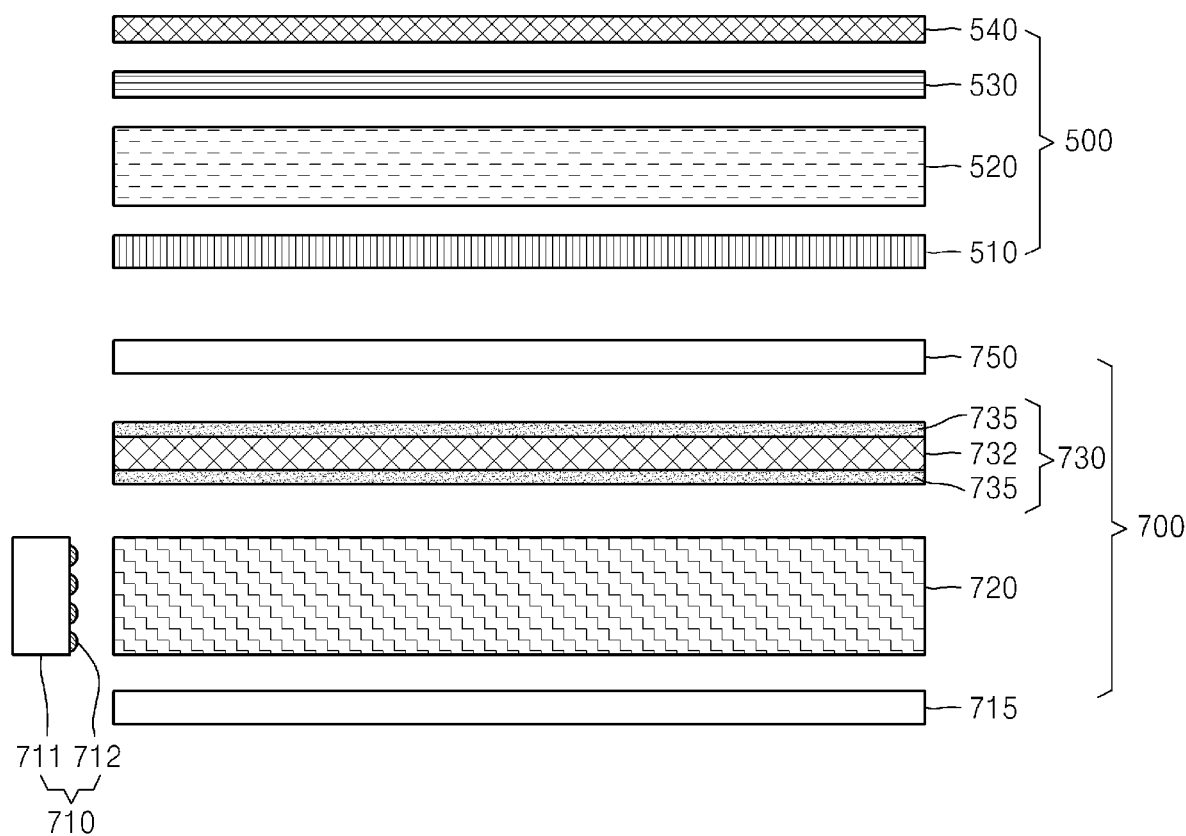
FIG. 21 is a cross-sectional view illustrating another embodiment of an LCD device.

FIG. 21 is a cross-sectional view illustrating another embodiment of an LCD device. The following explanation will focus on a difference from the previous embodiments.

Referring to FIG. 21, the LCD device includes a backlight unit 700, and the liquid crystal panel 500 that forms an image of a predetermined color by using white light emitted from the backlight unit 700. The backlight unit 700 includes an LED light source 710, a light guide plate 720 that uniformly guides light emitted from the LED light source 710 toward the liquid crystal panel 500, and a light converting layer 730 that converts light emitted from the light guide plate 720 into white light.

The LED light source 710 may be disposed on one or more side of the light guide plate 720, and a reflective plate 715 may be further disposed under the light guide plate 720. The LED light source 710 may be a light source that emits blue light, or a light source that emits ultraviolet light. The LED light source 710 may include a substrate 711, and a plurality of LEDs 712 that is disposed at predetermined intervals on the substrate 711.

The light converting layer 730 is disposed between the light guide plate 720 and the liquid crystal panel 500. The light converting layer 730 includes a diffusive film 732 that includes semiconductor nanocrystals for converting incident light into white light and light diffusing particles for diffusing incident light, and a barrier layer 735 that is disposed on one or more surface of the light-converting diffusive film 732. The light-converting diffusive film 732 may convert light into white light and diffuse light.

Each of moisture and oxygen transmission rates of the barrier layers 735 may be, but is not limited to, equal to or less than about 0.1 cc/m$^2$/day.

Various modified examples of the light converting layer 730 are illustrated in FIGS. 11 through 15, and a detailed explanation thereof has already been made and thus will not be repeated here. The LCD device of FIG. 21 may include a plurality of light converting layers sequentially disposed in a direction away from the LED light source 710 and/or the light guide plate 720. The plurality of light converting layers may be spaced apart from one another, and a blank layer may be defined between the plurality of light converting layers. The plurality of light converting layers may be disposed to have an emission wavelength with higher energy (that is, a shorter wavelength) as a distance from the LED light source 710 and/or the light guide plate 720 increases. Arrangement structures of the plurality of light converting layers may be variously modified as described above.

A predetermined optical sheet 750 for improving optical properties such as brightness may be further disposed between the light converting layer 730 and the liquid crystal panel 500.

An adhesive layer (not shown) including the barrier material may be further formed on a side surface of the light converting layer 730. The adhesive layer may surround the side surface of the light converting layer 730.

Figure 22:
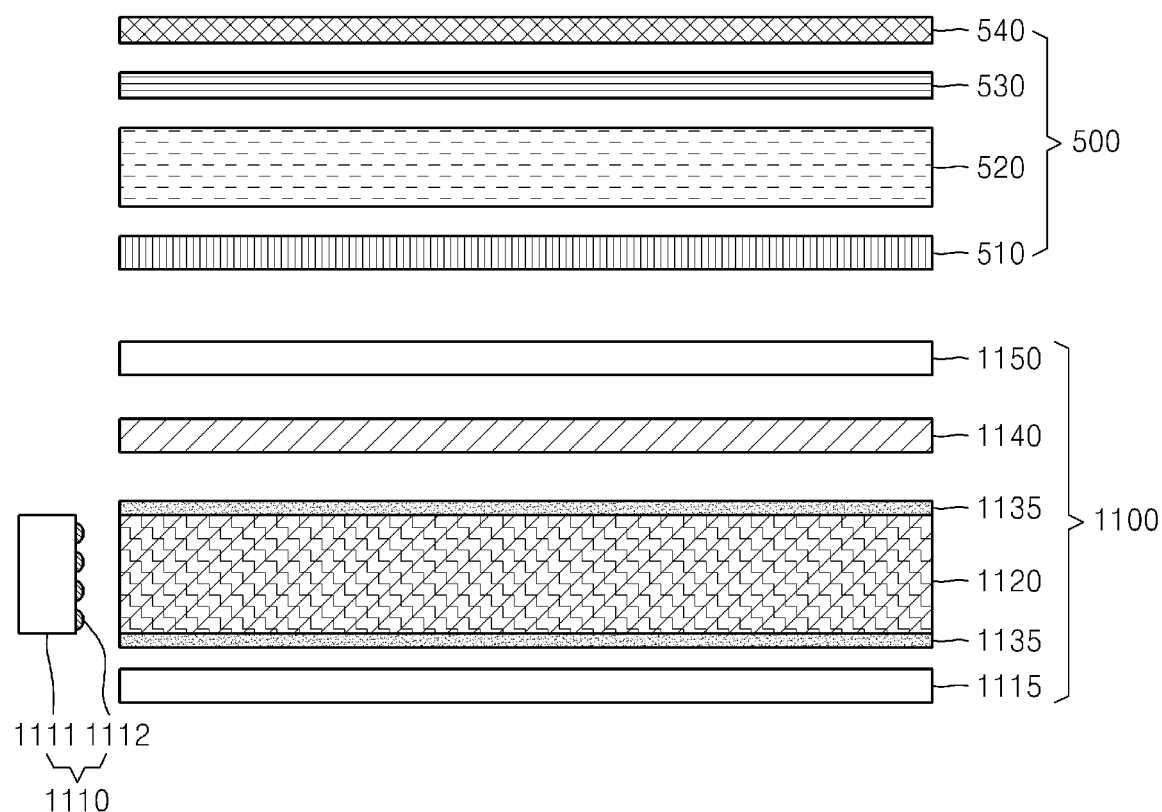
FIG. 22 is a cross-sectional view illustrating another embodiment of an LCD device.

FIG. 22 is a cross-sectional view illustrating another embodiment of an LCD device. The following explanation will focus on a difference from the previous embodiments.

Referring to FIG. 22, the LCD device includes a backlight unit 1100, and the liquid crystal panel 500 that forms an image of a predetermined color by using white light emitted from the backlight unit 1100. The backlight unit 1100 includes an LED light source 1110, and a light guide plate 1120 that uniformly guides light emitted from the LED light source 1110 toward the liquid crystal panel 500.

The LED light source 1110 may be disposed on one or more side of the light guide plate 1120, and a reflective plate 1115 may be further disposed under the light guide plate 1120. The LED light source 1110 may be a light source that emits blue light, or a light source that emits ultraviolet light. The LED light source 1110 may include a substrate 1111, and a plurality of LEDs 1112 that is disposed at predetermined intervals on the substrate 1111.

The light guide plate 1120 for guiding light incident from the LED light source 1110 toward the liquid crystal panel 500 may include semiconductor nanocrystals. Accordingly, the light guide plate 1120 may convert incident light into white light, and may guide light toward the liquid crystal panel 500. A barrier layer 1135 is disposed on one or more surface of the light guide plate 1120, and reduces or effectively prevents external moisture and/or oxygen from penetrating into the light guide plate 1120.

A diffusive plate 1140 may be further disposed between the light guide plate 1120 and the liquid crystal panel 500. The diffusive plate 11440 may diffuse white light incident from the light guide plate 1120 and outputs the diffused white light. Accordingly, uniformity of the white light passing through the diffusive plate 1140 may be improved.

A predetermined optical sheet 1150 for improving optical properties such as brightness may be further disposed between the diffused plate 1140 and the liquid crystal panel 500. The optical sheet 1150 may include at least one selected from, for example, a prism sheet, a brightness enhancement sheet and a micro-lens sheet.

An adhesive layer (not shown) including the barrier material may be further disposed on a side surface of the light guide plate 1120. The adhesive layer may surround the side surface of the light guide plate 1120.

Figure 23:
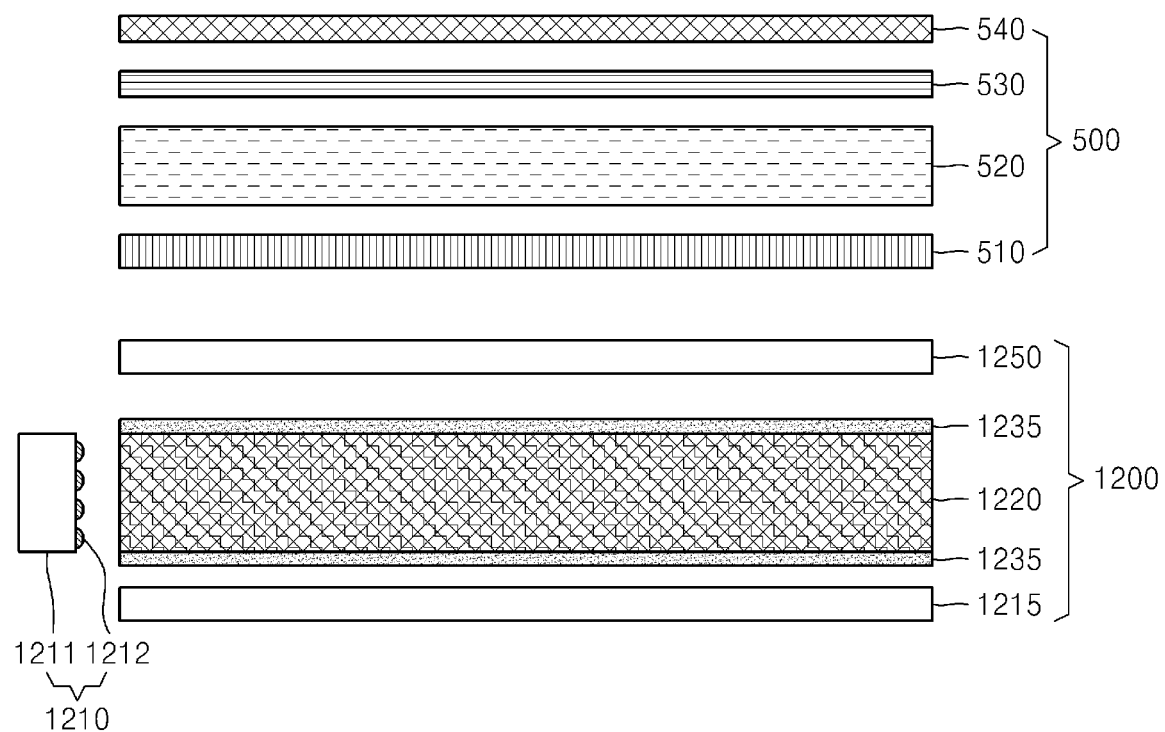
FIG. 23 is a cross-sectional view illustrating another embodiment of an LCD device.

FIG. 23 is a cross-sectional view illustrating another embodiment of an LCD device. The following explanation will focus on a difference from the previous embodiments.

Referring to FIG. 23, the LCD device includes a backlight unit 1200, and the liquid crystal panel 500 that forms an image of a predetermined color by using white light emitted from the backlight unit 1200. The backlight unit 1200 includes an LED light source 1210, and a light guide plate 1220 that uniformly guides light emitted from the LED light source 1210 toward the liquid crystal panel 500.

The LED light source 1210 may be disposed on one or more side of the light guide plate 1220, and a reflective plate 1215 may be further disposed under the light guide plate 1220. The LED light source 1210 may be a light source that emits blue light, or a light source that emits ultraviolet light. The LED light source 1210 may include a substrate 1211, and a plurality of LEDs 1212 that is disposed at predetermined intervals on the substrate 1211.

The light guide plate 1220 that guides light incident from the LED light source 1210 toward the liquid crystal panel 500 may include semiconductor nanocrystals for converting incident light into white light and light diffusing particles for diffusing incident light. Accordingly, the light guide plate 1220 may convert incident light into white light, diffuse the white light, and guide the diffused white light toward the liquid crystal panel 500. A barrier layer 1235 is disposed on one or more surface of the light guide plate 1220, and reduces or effectively prevents external moisture and/or oxygen from penetrating into the light guide plate 1220.

A predetermined optical sheet 1250 for improving optical properties such as brightness may be further disposed between the light guide plate 1220 and the liquid crystal panel 500. The optical sheet 1250 may include, but is not limited to, at least one selected from a prism sheet, a brightness enhancement sheet and a micro-lens sheet.

An adhesive layer (not shown) including the barrier layer may be further disposed on a side surface of the light guide plate 1220. The adhesive layer may surround the side surface of the light converting layer 1220.

According to the one or more embodiments, since a light converting layer for converting incident light into white light includes semiconductor nanocrystals, color reproducibility and color purity of white light may be improved. Since the light converting layer including the semiconductor nanocrystals is spaced apart from an LED light source, deterioration of the semiconductor nanocrystals due to heat generated from LEDs of the light source is reduced or effectively prevented. Also, since the light converting layer includes a barrier material, penetration of external moisture or oxygen into the semiconductor nanocrystals is reduced or effectively prevented. Accordingly, when the light converting layer converts incident light into white light, optical properties such as a wavelength, a full width at half maximum or quantum efficiency may not be changed, and thus brightness and color coordinates of white light may be maintained even when a backlight unit is driven for a long time.

While the invention has been particularly shown and described with reference to embodiments thereof, these embodiments are provided for the purposes of illustration and it will be understood by those of ordinary skill in the art that various modifications and equivalent other embodiments can be made from the invention.

What is claimed is:

1. A display device comprising:
a semiconductor nanocrystal composite comprising semiconductor nanocrystals and a barrier material having a moisture transmission rate and an oxygen transmission rate of equal to or less than about 0.1 cc/m2/day.

2. The display device of claim 1, further comprising a light source generating and emitting light,
wherein the semiconductor nanocrystal composite converts the light from the light source into another light.

3. The display device of claim 2, wherein the semiconductor nanocrystal composite has a shape of film.

4. The display device of claim 3, wherein the semiconductor nanocrystal composite further comprises:
at least one layer including the semiconductor nanocrystals, and
at least one layer including the barrier material.

5. The display device of claim 3, wherein the semiconductor nanocrystal composite further comprises:
a single one layer including both the semiconductor nanocrystals and the barrier material.

6. The display device of claim 2, wherein the semiconductor nanocrystals comprise at least one selected from a Group II-VI material, a Group III-V material, and a Group IV element.

7. The display device of claim 2, wherein the barrier material comprises at least one selected from an organic material and an inorganic material.

8. The display device of claim 2, wherein the light source comprises a light-emitting diode.

9. The display device of claim 8, wherein the semiconductor nanocrystal composite is configured to be spaced apart from the light source.

10. The display device of claim 2, further comprising a liquid crystal panel forming an image by using another light emitted from the semiconductor nanocrystal composite.

11. The display device of claim 10, further comprising a transparent substrate in which at least one of the semiconductor nanocrystals and the barrier material is disposed.

12. The display device of claim 11, wherein the transparent substrate comprises polyethylene terephthalate.

13. The display device of claim 10, further comprising a diffusive plate between the light source and the semiconductor nanocrystal composite or between the semiconductor nanocrystal composite and the liquid crystal panel.

14. The display device of claim 10, wherein the semiconductor nanocrystal composite further comprises light diffusing particles which diffuse the light.

15. The display device of claim 14, wherein the semiconductor nanocrystal composite further comprises:
at least one layer including the semiconductor nanocrystals and the light diffusing particles, and
at least one layer including the barrier material.

16. The display device of claim 14, wherein the semiconductor nanocrystal composite further comprises:
a single one layer including each of the semiconductor nanocrystals, the light diffusing particles and the barrier material.

17. The display device of claim 10, further comprising a light guide plate between the light source and the semiconductor nanocrystal composite, wherein the light guide plate guides the light emitted from the light source toward the semiconductor nanocrystal composite.

18. The display device of claim 17, wherein the light guide plate comprises a light emitting first surface, a second surface opposite to the light emitting first surface, and a side surface connecting the first and second surfaces to each other, and the light source faces the side surface of the light guide plate.

19. A semiconductor nanocrystal composite comprising semiconductor nanocrystals; and
a barrier material having a moisture transmission rate and an oxygen transmission rate of equal to or less than about 0.1 cc/m2/day.

20. The semiconductor nanocrystal composite of claim 19, wherein the semiconductor nanocrystal composite has a shape of film.

21. The semiconductor nanocrystal composite of claim 20, wherein the semiconductor nanocrystal composite further comprises:
at least one layer including the semiconductor nanocrystals, and
at least one layer including the barrier material.

22. The semiconductor nanocrystal composite of claim 20, wherein the semiconductor nanocrystal composite further comprises:
a single one layer including both the semiconductor nanocrystals and the barrier material.

23. The semiconductor nanocrystal composite of claim 19, wherein the semiconductor nanocrystals comprise at least one selected from a Group II-VI material, a Group III-V material, and a Group IV element.

24. The semiconductor nanocrystal composite of claim 19, wherein the barrier material comprises at least one selected from an organic material and an inorganic material.

25. The semiconductor nanocrystal composite of claim 24, wherein the organic material comprises at least one selected from thiolene, hybrid epoxy, polyurea, polytetrafluoroethylene, polydimethylsiloxane, polyvinylchloride, polycarbonate, polystyrene, polyimide, parylene, polyethylacrylate, and polymethylmethacrylate.

26. The semiconductor nanocrystal composite of claim 24, wherein the inorganic material comprises at least one selected from silicon oxide, aluminum oxide, titanium oxide, indium oxide, tin oxide, indium oxide, tantalum oxide, zirconium oxide, and niobium oxide.

* * * * *